March 6, 1956  L. T. COOKSON ET AL  2,737,285
MEANS FOR POSITIVELY MOVING CONTAINERS FROM
A CONVEYOR TO A PREDETERMINED POSITION
Filed Feb. 2, 1953  4 Sheets-Sheet 4
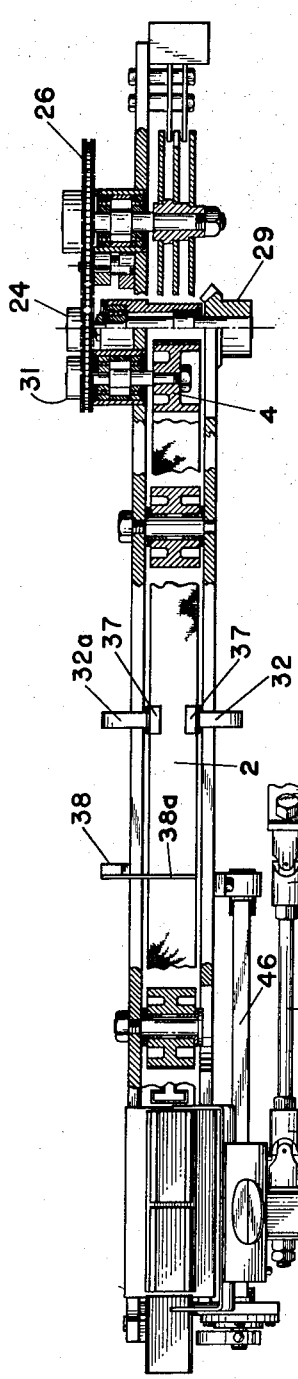
Fig. 6
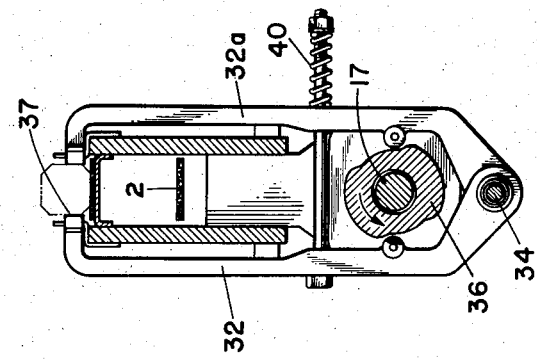
Fig. 7
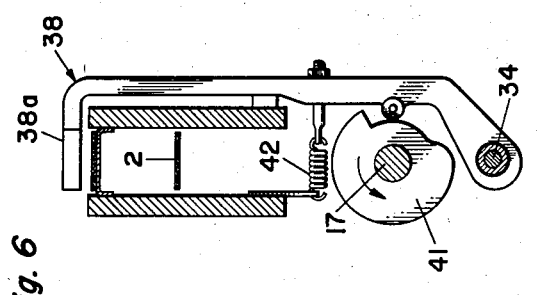
Fig. 8
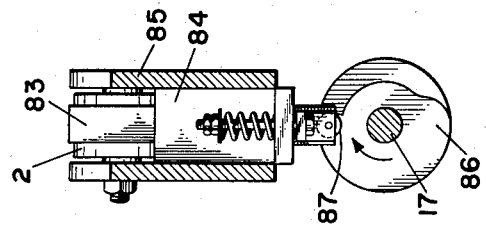
Fig. 9
INVENTORS
LEONARD T. COOKSON
WILLIAM R. SMITH
BY
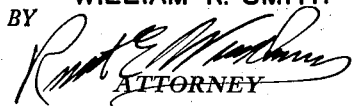
ATTORNEY

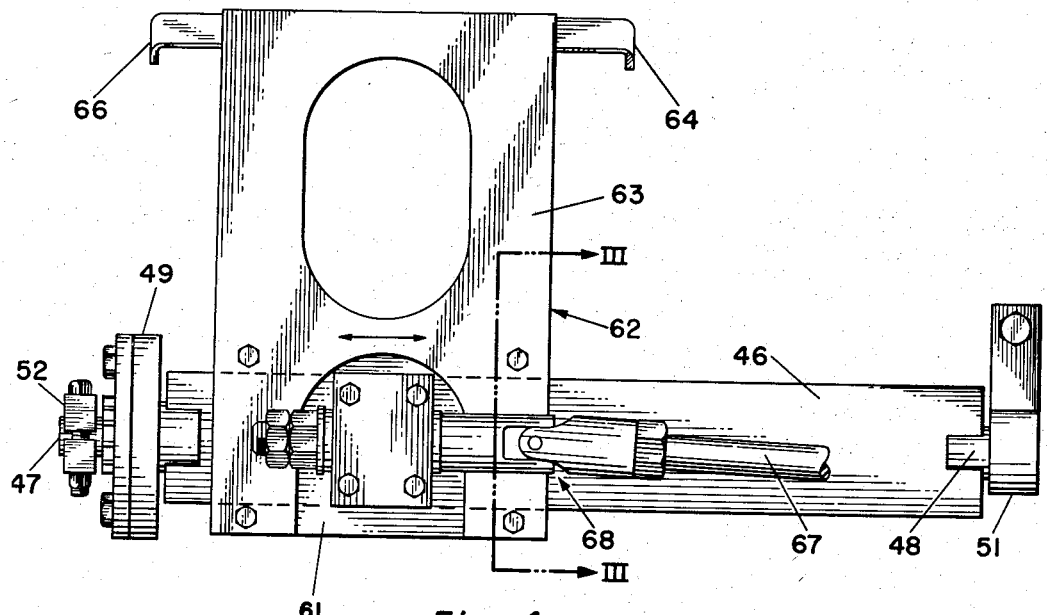
Fig. 4
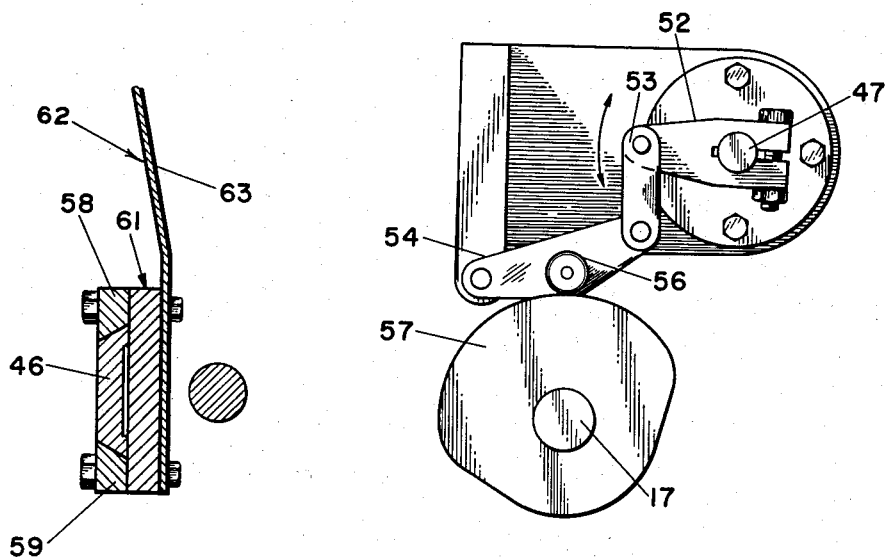
Fig. 3
Fig. 5
INVENTORS
LEONARD T. COOKSON
WILLIAM R. SMITH
BY
*ATTORNEY*

United States Patent Office 2,737,285
Patented Mar. 6, 1956

2,737,285

MEANS FOR POSITIVELY MOVING CONTAINERS FROM A CONVEYOR TO A PREDETERMINED POSITION

Leonard T. Cookson and William R. Smith, Kalamazoo, Mich., assignors to The Upjohn Company, Kalamazoo, Mich., a corporation of Michigan Application February 2, 1953, Serial No. 334,572

7 Claims. (Cl. 198—24)

This invention relates to a machine for feeding containers to a label applicator and particularly to a type thereof utilizing positively engaging members for embracing said containers and moving them into label receiving position.

In the packaging art, the problem is frequently presented of feeding a plurality of containers to a label applying device, holding them in place while the label is being applied and then permitting them to move on to other processing or conveying devices. While a wide number of such feeding devices have been presented for use with various kinds of containers and various kinds of label applying machines, many of such devices have been unduly complicated and therefore subject to high cost, both of original construction and maintenance. We have, accordingly, developed a device which is relatively simple in construction and operates by a positively reacting mechanical member of simple construction and hence all of the necessary functions of building, adjusting, and operating can be carried out relatively easily and without undue expense.

Accordingly, a major object of the invention is to provide a device for feeding containers to a label applying machine which device will operate positively and without likelihood of inaccuracies.

A further object of the invention is to provide a device, as aforesaid, which will be sufficiently simple to be conducive to economical manufacture, adjustment and maintenance.

A further object of the invention is to provide a device, as aforesaid, wherein the parts react to positive mechanical actuation.

A further object of the invention is to provide a device, as aforesaid, having a single main drive shaft on which is carried, or from which is driven, a series of control operating cams.

A further object of the invention is to provide a device, as aforesaid, which will meter the containers on a constantly moving conveyor belt.

A further object of the invention is to provide a device having a container engaging member which will move transversely with respect to a selected axis to engage the containers and then longitudinally along said axis to move them into label receiving position and then again transversely to release the containers.

Other objects and purposes of the invention will be apparent to persons acquainted with equipment of this general type upon a reading of the following specification and inspection of the accompanying drawings.

In the drawings:

Figure 3 is a section of the slide mechanism as appearing at line III—III of Figure 4.

Figure 4 is a detail of the container holding mechanism shown together with said slide mechanism and free of other parts of the machine.

Figure 5 is a view from the lefthand end of Figure 4 showing certain actuation details and showing same free from associated parts of the appartus.

Figure 6 is a partially broken, top view of a portion of the machine shown in Figure 1.

Figure 7 is a section taken on the line VII—VII of Figure 1.

Figure 8 is a section taken on the line VIII—VIII of Figure 1.

Figure 9 is a section taken on the line IX—IX of Figure 1.

In general

In general, our apparatus contemplates the provision of a continuous feeding conveyor supplied with suitable metering means and an oscillatingly driven container moving device. Said container moving device moves transversely for engaging and disengaging containers and longitudinally for moving engaged containers into label receiving position. Other means preferably cam driven, are supplied for moving the foregoing named parts as desired.

Detailed description

Figure 1:
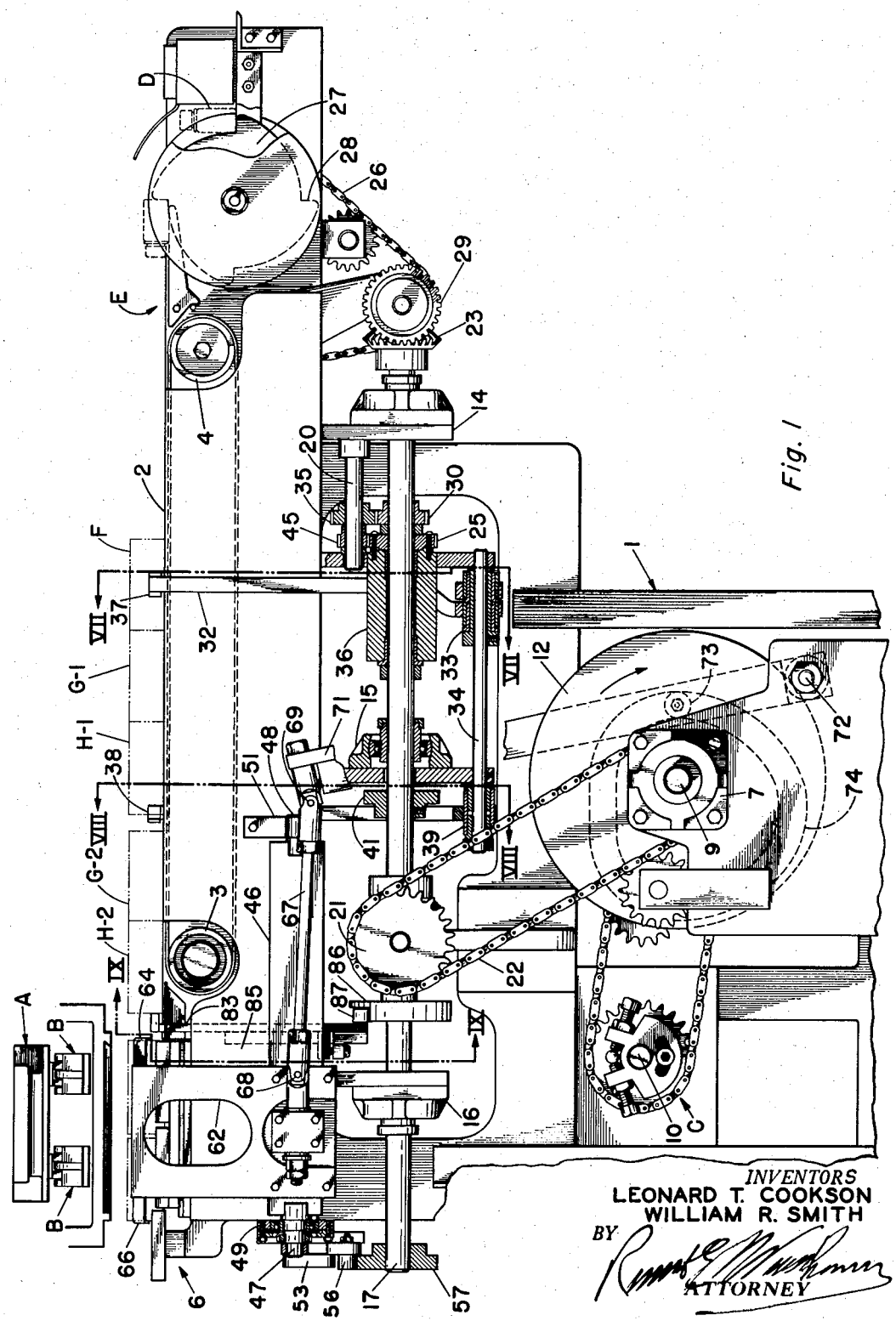
Figure 1 represents a side, partially broken, assembly view of the machine of our invention, certain of said broken portions being shown in section.
Figure 2:
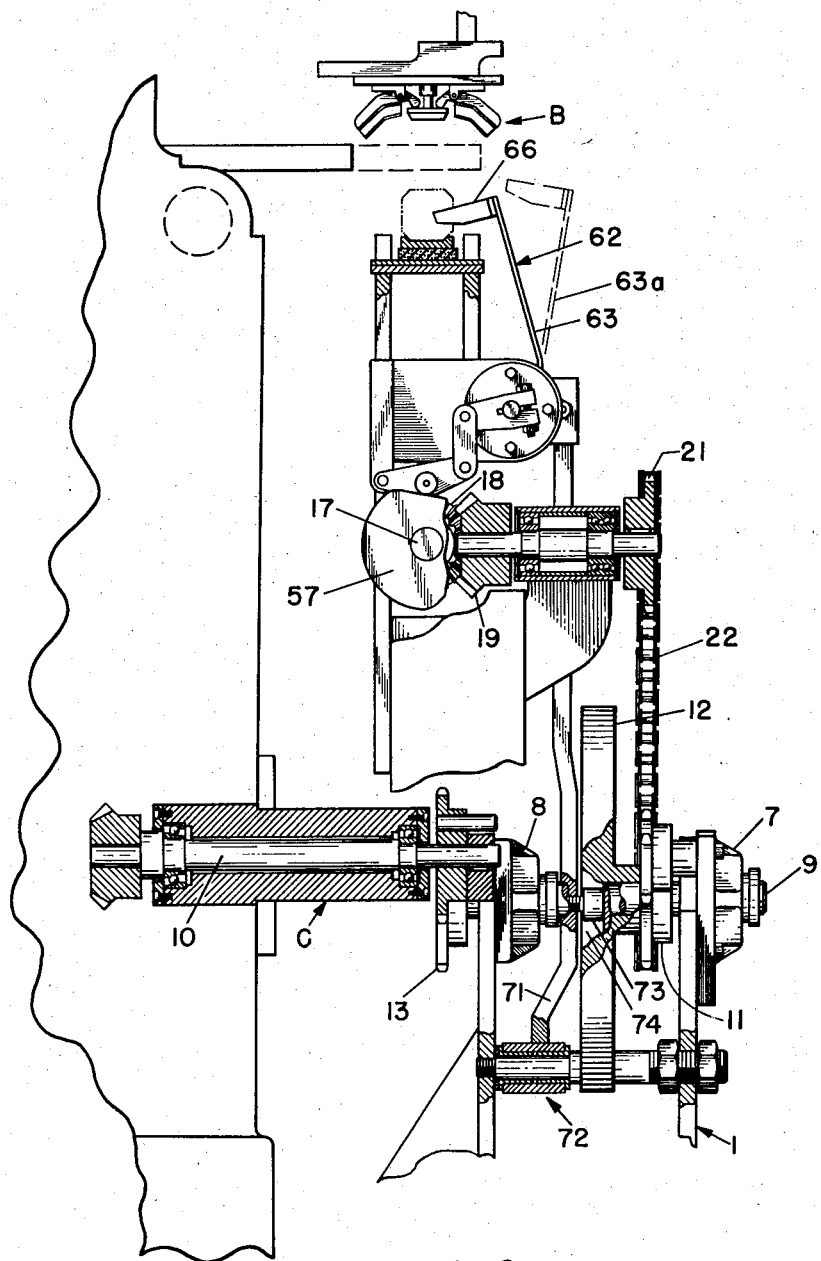
Figure 2 represents an end broken view of said machine, with certain said broken parts being shown in central section.

For purpose of convenience in reference, the terminology "rightwardly" and "leftwardly" will refer to the position of the parts as appearing in Figure 1 of the drawing, the term "upwardly" and "downwardly" will refer to the normal position of operation of the device and the terms "forwardly" and "rearwardly" will refer to the directions rightwardly and leftwardly respectively as appearing in Figure 2, it being assumed that the rightward part of the machine in Figure 2 will normally be closest to the operator and that part of the machine to the left in Figure 2 will be away from the operator. It should be understood, however, that these terms are used merely for convenience in reference and they have no limiting significance whatsoever.

While the specific embodiment chosen for illustrative purposes is designed to handle two containers at a time, and the description proceeds on this basis, it will be understood that the machine could be readily modified to handle only a single container at a time or to handle three or more containers at a time and the description will be so interpreted.

Turning now to the drawings in more detail, there is provided a frame 1 supporting a conveyor 2 on the conveyor wheels 3 and 4. A label applying device of any conventional sort, here of dual type, is provided for use with said feeding machine and is preferably provided with pressure pads B of conventional sort for pressing the adhesive covered label against the containers. During the label applying operation the containers are supported on stationary platform 6, which platform is substantially co-planar with and closely adjacent to the delivery end of the conveyor 2.

Said frame 1 supports the bearing housings 7 and 8 (Figure 2) which in turn support the shaft 9. Said shaft supports a sprocket 11, whose function will appear hereinafter and it also supports a rotating cam 12 and a further sprocket 13. A power supply means C (Figure 1) is operatively connected to the sprocket 13 by any convenient means, and such power supply C may conveniently be a shaft 10 which in turn is driven by the labeling machine.

The frame also supports the bearings 14 and 15 and 16 (Figure 1) which in turn support the line shaft 17. Said line shaft 17 is driven through a set of bevel gears 18 and 19 (Figure 2) which in turn are driven by the sprocket 21 from the sprocket 11 by a suitable chain 22. A further bevel gear 23 (Figure 1) at the extreme righthand end of said line shaft 17 acts through another bevel gear 29 (Figures 1 and 6) to drive the sprocket 24 which, through the chain 26, drives a conventional conveyor feeding device 27. The conveyor feeder 27 is in this instance supplied with the steps 28 which engage a container, here a bottle shown at D (Figure 1) and delivers it into the position E. The chain 26 also drives a sprocket 31 (Figure 6) which in turn drives the conveyor drive wheel 4 and thereby drives the conveyor 2. It will be appreciated that all of the parts thus far described are positively driven and the speeds thereof all bear a predetermined relation to the speed of the power source C.

A pair of gripping bars 32 and 32a (Figures 1 and 7) are each pivotally mounted by the bearing structures 33 on the shaft 34. A cam 36 is rotatably supported on the shaft 17 and is driven at one-half the speed of said shaft 17 by the gear 25 which is secured to said cam. Gear 25 is driven from and by the shaft 17 through the gears 45 and 35, secured on the shaft 20, and the gear 30 secured to shaft 17. Said cam 36 oscillates said gripping bars on the shaft 34 for moving them away from the bottles and the spring 40 (Figure 7) returns said gripping bars toward each other. Pads 37 at the upper ends of said gripping bars effect the actual engagement with the containers.

A gate 38 (Figures 1, 6 and 8), including a container blocking portion 38a, is similarly mounted on the bearing structure 39 on the shaft 34. A cam 41 moves said gate away from a position in which the portion 38a obstructs the conveyor and the spring 42 returns it into conveyor obstructing position.

A further gate 83 (Figure 9) is supported on a slide 84 which slide is mounted for vertical reciprocation within frame structure 85. A cam follower 87 is connected to the lower end of the slide 84 and is adapted for actuation by the cam 86, said cam 86 being mounted on and rotatable with the line shaft 17. Said gate 83 is so positioned with respect to the leftward end of the conveyor 2 that it will arrest the movement of containers on said conveyor prior to their reaching labeling position under the label mechanism A.

A slide 46 (Figures 1 and 4) is mounted at each of its ends on the shafts 47 and 48, which shafts are rotatably supported by the bearing structures 49 and 51. A bell crank 52 (Figure 5) is connected through the link 53 to a cam follower link 54 which latter rotatably supports a cam follower 56 which operates against the cam 57. Said cam is mounted on the line shaft 17 for rotation therewith. It will be apparent that as said cam 57 rotates it will effect an oscillation of the shaft 47 and through it an oscillation of the slide 46 around its longitudinal axis.

The slide engaging portion 61 (Figures 3 and 4) of the container feeding member 62 carries at each of its longitudinal edges the guides 58 and 59 which slidably engage the slide 46 (Figure 3). Said container feeding member has an upwardly extending portion 63 which at its upper end mounts container engaging wings 64 and 66.

The rod 67 (Figure 1) is affixed at its one end through the universal joint 68 to the container feeding member 62 and at its other end through another universal joint 69 to the upper end of a lever 71. Said lever 71 is pivotally affixed at 72 (Figures 1 and 2) to the frame of the apparatus and is provided with a cam follower 73 operating in the groove 74 of the cam 12.

*Operation*

Rotative energy applied from the source C to the sprocket 13 will be transmitted to the shaft 9 (Figures 1 and 2) and thence through the sprocket 11, chain 22, sprocket 21, the bevel gears 18 and 19 to the line shaft 17. Rotation of said line shaft 17 will be transmitted through the bevel gears, chains and sprockets at the rightward end of the apparatus to feeder 27 and to the sprocket 31 driving the conveyor 2 through the wheel 4 in a conventional manner which will be well understood in view of the description which has already been made. Likewise, rotation of the line shaft 17 will cause oscillation of the gripper members 32 and the gate 38 in response to movement of the dams 36 and 41, respectively, and in response to the return force of the springs 40 and 42, respectively. Rotation of the cam 12 (Figure 1) will act through the cam follower 73 to cause oscillation of the lever 71 on its pivotal mounting 72 and this will act through the rod 67 and the parts attached at each end thereof to reciprocate the container feeding member 62 rightwardly and leftwardly on the slide 46. Simultaneously, action of the cam 57 (Figures 2 and 5) against the cam follower 56 will act through the linkage associated with said cam follower and shaft 47 to cause oscillation of said slide 46 around its pivotal mountings.

It will be obvious in view of the foregoing that all of these movements may be timed as desired to effect the steps hereinafter more particularly mentioned.

As the containers successively reach the position indicated at D in Figure 1, one of the steps 28, which is then in the position indicated at D in Figure 1, will lift said containers one at a time into the position indicated at E from whence they will be discharged onto the conveyor 2. With the gate 38 in closed position as appearing in Figures 1, 6 and 8, the containers will pass between the grippers 37 and will be blocked by said gate. The grippers 37 will then come together to engage the container indicated at F after which the gate 38 is retracted. The containers G and H, indicated at G-1 and H-1, will now move leftwardly until they are blocked by the gate 83 at which point they occupy the positions indicated at G-2 and H-2.

With the container feeding member in its rightward position adjacent the containers G and H in their G-2 and H-2 positions, and with the slide 46 so oscillated that the upper end of the container feeding member 62 is leaning away from the containers G and H (as indicated at 63a in Figure 2), the slide 46 is caused to rotate sufficiently to bring the upper end of said container feeding member 62 adjacent the containers G and H with the wings 64 and 66 embracing the mutually remote ends of said containers (the solid line position shown in Figure 2). At this point the cam 86 (Figure 9) rotates to lower the gate 83. In such position the lever 71 (Figure 1) acts through the link 67 to move the container feeding member 62 leftwardly into the position shown in Figure 1. In such position, the labels are applied. While said labels are being applied the slide 46 is again rotated sufficiently to move the upper end of the container feeding member 62 away from said containers, to the broken line position shown in Figure 2, and the container feeding member is then caused to move on the slide rightwardly until it returns to its initial position.

This cycle will be repeated and containers will continue to be fed into position under the labeling device for as long as desired and all of the parts at all times are under positive and precise control.

It will be recognized that the apparatus is relatively simple and that all of its parts are subject to ready adjustment for the purpose of timing their several motions with respect to each other and that once properly timed and the parts fixed, they will not readily get out of time.

While a specific embodiment of the invention has been here set forth as a means for illustrating same, it will be recognized that numerous modifications may be made from the specific form here shown which will be included within the scope of the hereinafter appended claims excepting as such claims may by their own terms expressly require otherwise.

We claim:
1. In a feeding device for moving objects from a moving surface to a substantially co-planar stationary platform, the combination comprising: an elongated conveyor, the delivery end thereof being closely adjacent said platform; an elongated slide of non-circular cross-section and means supporting same for limited rotation about its longitudinal axis and against axial movement; a feeding member slidably mounted on said slide, the upper end of said feeding member being adapted for engaging said objects; first drive means adapted for oscillating said slide about its said axis at a predetermined rate and in a predetermined pattern; second drive means reciprocating said feeding member along said slide in timed relation to said oscillations thereof, and between object engaging positions over said conveyor and over said platform.

2. In a feeding device for moving objects from a moving surface to a substantially co-planar, stationary platform, the combination comprising: an elongated conveyor, the delivery end thereof closely adjacent said platform; an elongated slide of non-circular cross-section and means supporting same for limited rotation about its longitudinal axis and against axial movement; a feeding member slidably mounted on said slide and object engaging means secured thereto; a line shaft parallel with said conveyor; a first cam on said shaft; means driven by said first cam effecting oscillation of said slide around its longitudinal axis at a predetermined rate and in a predetermined pattern, said engaging means being moved thereby into and out of object engaging position; a second cam and means coupled with said shaft effecting rotation of said second cam in timed relationship to the rotation of said first cam; linkage driven by said second cam for reciprocating said feeding member along said slide in timed relation to the oscillation of said slide about its longitudinal axis, and between object engaging positions over said conveyor and over said platform.

3. The device defined in claim 2 including also: means for constantly driving said conveyor; a gate pivotally mounted for movement into and out of the path of objects on said conveyor; and a cam mounted on said line shaft operating said gate in timed relationship to the operating of said feeding member, said gate, said member and said slide being operated through complete cycles with each revolution of said shaft.

4. The device defined in claim 2 including also: means for constantly driving said conveyor from said line shaft; a gate pivotally mounted for movement into and out of the path of objects on said conveyor; and a cam mounted on said line shaft operating said gate in timed relationship to the operating of said feeding member, said gate, said member and said slide being operated in sequence through complete cycles with each rotation of said shaft.

5. In a feeding device for moving objects from a moving surface to a co-planar stationary platform, the combination comprising: an elongated conveyor, the delivery end thereof closely adjacent said platform; an elongated slide of non-circular cross-section and means supporting same for limited rotation about its longitudinal axis and against axial movement; a feeding member slidably mounted on said slide and object engaging means secured thereto; a line shaft parallel with said conveyor; a first timeable driving means driven in timed relation with said line shaft; means driven by said first timeable driving means effecting oscillation of said slide around its longitudinal axis at a predetermined rate and in a predetermined pattern, said engaging means being moved thereby into and out of object engaging position; a second timeable driving means coupled with said line shaft; linkage driven by said second timeable driving means for reciprocating said feeding member along said slide in timed relation to the oscillation of said slide about its longitudinal axis, and between object engaging positions over said conveyor and over said platform.

6. In a machine for automatically moving objects at preselected intervals and in preselected quantities from a moving surface to a stationary platform, the combination comprising: an elongated conveyor substantially co-planar with said platform, the delivery end of said conveyor closely adjacent said platform; a shaft parallel with and below said conveyor; gripping means resiliently urged into the path of objects on said conveyor; a first cam on said shaft controlling said urging; a gate resiliently urged into said path between said gripping means and said delivery end; a second cam on said shaft controlling the urging of said gate; an elongated slide parallel with said conveyor and of non-circular cross-section; means supporting said slide for rotation about its lengthwise axis and against axial movement; a feeding arm slidably supported at one end upon said slide, and object embracing means secured to the other end of said arm; a third cam on said shaft and means engaged thereby effecting rotational oscillation of said slide, said embracing means being moved thereby into and out of said path; actuating means reciprocating said feeding arm along said slide between a position over said conveyor and a position over said platform; and drive means rotating said shaft, said gripping means, said gate, said slide and said feeding arm being operated in sequence through complete cycles with each rotation of said shaft.

7. In a machine for automatically moving objects at preselected intervals and in preselected quantities from a moving, elongated, conveyor to a stationary surface, the combination comprising: means supporting said elongated conveyor substantially co-planar with said platform, said conveyor having a delivery end closely adjacent said platform; a line shaft parallel with and below said conveyor; a pair of gripping members pivoted about an axis parallel with said shaft and means urging said members toward each other in the path of objects on said conveyor; a first cam on said shaft controlling said urging of said members; a gate pivoted about an axis parallel with said shaft and means urging said gate into said path between said members and said end of said conveyor; a second cam on said shaft controlling said urging of said gate; an elongated slide parallel with said conveyor and of non-circular cross-section; means supporting said slide at the ends thereof for rotation about its lengthwise axis and against axial movement; a feeding arm slidably supported at one end upon said slide, and object embracing means secured to the other end of said arm; a third cam on said shaft and means engaged thereby effecting a limited oscillation of said slide about its axis, said embracing means being alternately moved thereby into and out of said path; actuating means coupled with said shaft and reciprocating said feeding arm along said slide between positions in said path alternately over said conveyor and over said platform; and drive means rotating said shaft, said members, said gate, said slide and said feeding arm being operated in sequence through complete cycles during each rotation of said shaft.

References Cited in the file of this patent

UNITED STATES PATENTS

| | | |
|---|---|---|
| 1,440,288 | Gray | Dec. 26, 1922 |
| 1,627,391 | House | May 3, 1927 |
| 2,371,926 | Schmitt | Mar. 20, 1945 |